(12) United States Patent
Hubert et al.

(10) Patent No.: US 6,252,312 B1
(45) Date of Patent: Jun. 26, 2001

(54) DIRECT-VOLTAGE POWER PACK

(75) Inventors: Rolf Hubert, Bonn; Horea Stefan Culca, Siegburg, both of (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/292,299

(22) Filed: Apr. 15, 1999

(30) Foreign Application Priority Data

Apr. 17, 1998 (DE) ............................................. 198 17 914

(51) Int. Cl.[7] ............................................................ H02J 9/00
(52) U.S. Cl. ..................................................... 307/64; 361/88
(58) Field of Search ..................................... 307/64, 66, 65, 307/150; 361/88, 86; 700/11, 21, 82

(56) References Cited

U.S. PATENT DOCUMENTS

| | | |
|---|---|---|
| 4,399,538 | 8/1983 | Cholakian et al. . |
| 4,728,808 * | 3/1988 | Bet-Esh et al. ........................ 307/66 |
| 4,827,149 | 5/1989 | Yabe . |
| 5,081,444 * | 1/1992 | Nicholson et al. .................. 340/545 |
| 5,118,962 * | 6/1992 | Ishii et al. ............................... 307/64 |
| 5,357,395 * | 10/1994 | Bissell et al. ............................ 361/88 |
| 5,428,252 * | 6/1995 | Walker et al. ............................ 307/64 |
| 5,691,870 * | 11/1997 | Gebara ..................................... 361/86 |
| 5,805,091 * | 9/1998 | Sherry et al. ............................ 341/20 |

FOREIGN PATENT DOCUMENTS

| | | |
|---|---|---|
| 0 049 462 | 4/1982 | (EP) . |
| 05035614 | 2/1993 | (JP) . |

OTHER PUBLICATIONS

Market and Technology–Design and Electronics, Issue 26, Dec. 22, 1987, pp. 6–13 mentioned in specification. Schematics Considered (Document in German).

* cited by examiner

Primary Examiner—Josie Ballato
Assistant Examiner—Roberto Rios
(74) Attorney, Agent, or Firm—Kenyon & Kenyon

(57) ABSTRACT

A circuit configuration for a direct-voltage power pack of an electronically controlled switching device, particularly of a small programmable control system, which is externally supplied with voltage, having an arithmetic-logic unit, signal inputs and signal outputs. This circuit has a back-up supplier for the backup supply of the supply voltage and a detector for detecting the input voltage which is not backed up, the detector interacting with the arithmetic-logic unit in such a way that, in response to any voltage failure, the signal inputs are reliably prevented from being read in.

10 Claims, 2 Drawing Sheets

DIRECT-VOLTAGE POWER PACK

FIELD OF THE INVENTION

The present invention relates to a circuit configuration for a direct-voltage power pack of electronically controlled switchgear, as well as to a method for reading in input signals of electronic switchgear.

BACKGROUND INFORMATION

The publication *"Markt & Technik—Design & Elektronik"* [Market and Technology—Design and Electronics], issue 26, dated Dec. 22, 1987, describes voltage-monitoring integrated circuits (ICs) for microprocessor systems. The described microprocessors are used to secure volatile data in the event of a voltage failure, in that the system is set to recognize a drop below a defined threshold voltage before it occurs, thus leaving enough time to secure the data in a non-volatile memory.

Further, it is known in the case of conventional programmable control systems, particularly in the case of small control systems, to supply the control system via a separate, external, direct-voltage power pack. The supply voltage provided by this external power pack is switched, within the control system to be supplied, to an internal circuit configuration which assures protection against reverse voltage on the one hand, and on the other hand, assures a backup supply of supply voltage for the internal power supply during short-duration failures of the external supply voltage. Small control systems of this kind are generally used for smaller control tasks, which must be implemented at the lowest cost possible. For this reason, usually one and the same external power pack is used for the external voltage supply and for driving the signal inputs of the control system. The external voltage supply is switched internally, within the control system to be supplied, to a circuit configuration of an internal power pack. This circuit configuration has at least one backup capacitor for the backup supply of supply voltage, so that voltage failures of the external power pack of short duration (of the order of magnitude of approx. 10–15 ms) can be bridged by the backup capacitor, thus allowing the control system to continue functioning unaffected. Only in response to longer voltage failures, during which the internal backup voltage also collapses, is the arithmetic-logic unit of the control system switched into a defined initial state by a "power-fail" signal (PFI). The disadvantage of this, however, is that the short-duration external voltage failures, which also occur at the signal inputs of the control system, can result in misinformation in an application program to be processed.

SUMMARY OF THE INVENTION

An object of the present invention is to produce a circuit configuration for a direct-voltage power pack which assures that the signal inputs of an electronically controlled switching device, as described at the outset, are read in faultlessly. It is further intended to provide a method for faultlessly reading in the signal inputs of such switchgear.

The present invention provides a circuit configuration for a direct-voltage power pack of an electronically controlled switching device (2), particularly of a small programmable control system, externally supplied with direct voltage, having an arithmetic-logic unit ($\mu c$), signal inputs (4) and signal outputs (6), the external voltage supply of the switching device also being used as the voltage source for connection to the signal inputs (4), and the circuit configuration having a backup voltage supplier (20) for the backup supply of the supply voltage ($U_{ext}$). The circuit configuration is characterized by a detector (22) for detecting the input voltage which is not backed up and for generating an additional signal (DC-Low) as a function of the presence of the detected input voltage, the signal inputs (4) being read in by the arithmetic-logic unit ($\mu C$) as a function of the state of the generated signal (DC-Low).

Advantageously, the detector (22) may be designed as a comparator. The circuit configuration may be used in a programmable control system, the control system having a display screen (14) and an operating unit (8). The arithmetic-logic unit (C), the display screen (14), the operating unit (8), the signal inputs (4) and the signal outputs (6) may be accommodated in a shared housing, and switching functions may be programmable by the user via a menu-driven user interface on the display screen (14).

The present invention also provides a method for reading in input signals in switchgear, particularly in a small programmable control system, which are externally supplied with direct voltage and have an arithmetic-logic unit ($\mu c$), signal inputs (4) and signal outputs (6), the external voltage supply of the switching device also being used as the voltage source for the connection to the signal inputs (4), and the circuit configuration having a detector (20) for the backup supply of the supply voltage ($U_{ext}$). The method is characterized in that a binary monitoring signal (DC-Low) is generated by a comparator (22) as a function of the presence of the supply voltage which is not backed up, and the arithmetic-logic unit ($\mu c$) queries this monitoring signal (DC-Low) at least at the beginning of each program cycle, and the signal inputs (4) are read into the switching device as a function of the state of the monitoring signal (DC-Low).

Advantageously, the signal inputs (4) are capable of not being read in, in the event the supply voltage ($U_{ext}$) is not present.

Important components of the circuit configuration of the present invention are a reverse voltage protection diode and a backup capacitor, the internal supply voltage being tapped off as backup voltage downstream of this circuit configuration, and, according to the present invention, the external voltage which is not backed up being tapped off upstream of this circuit configuration. In this context, the detector, particularly a comparator for comparing the external voltage to a fixed threshold value, is used to monitor the external voltage for failures of short duration which are not recognized by detecting the backup internal supply voltage. If a failure of the external supply voltage is detected, the arithmetic-logic unit of the switching device will prevent the signal inputs from being read in. Thus, misinformation due to short-duration failures of the external supply voltage is advantageously avoided.

BRIEF DESCRIPTION OF THE DRAWINGS

Further advantages and refinements of the present invention are elucidated in the following description, in which.

DETAILED DESCRIPTION

Figure 1:
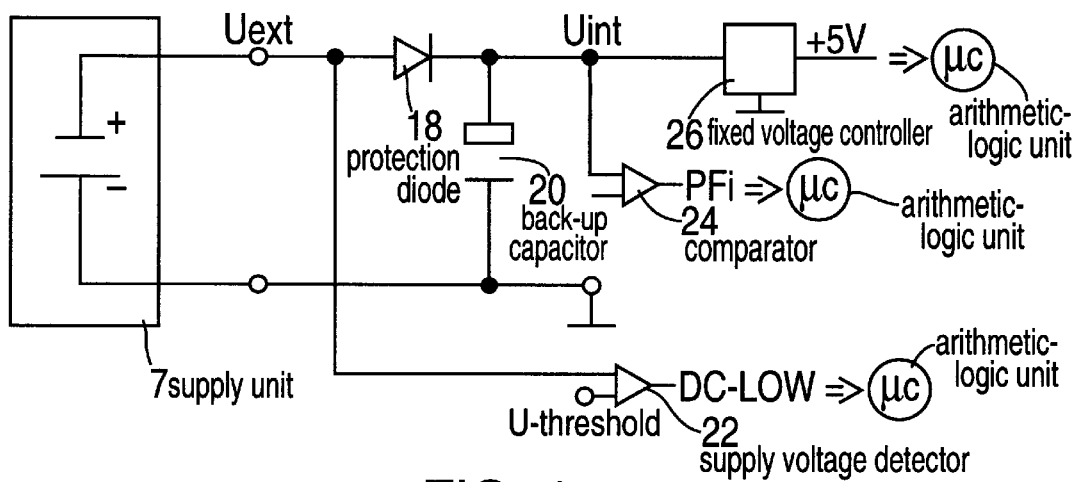
FIG. 1 shows a schematic representation of the circuit configuration according to the present invention.
Figure 3:
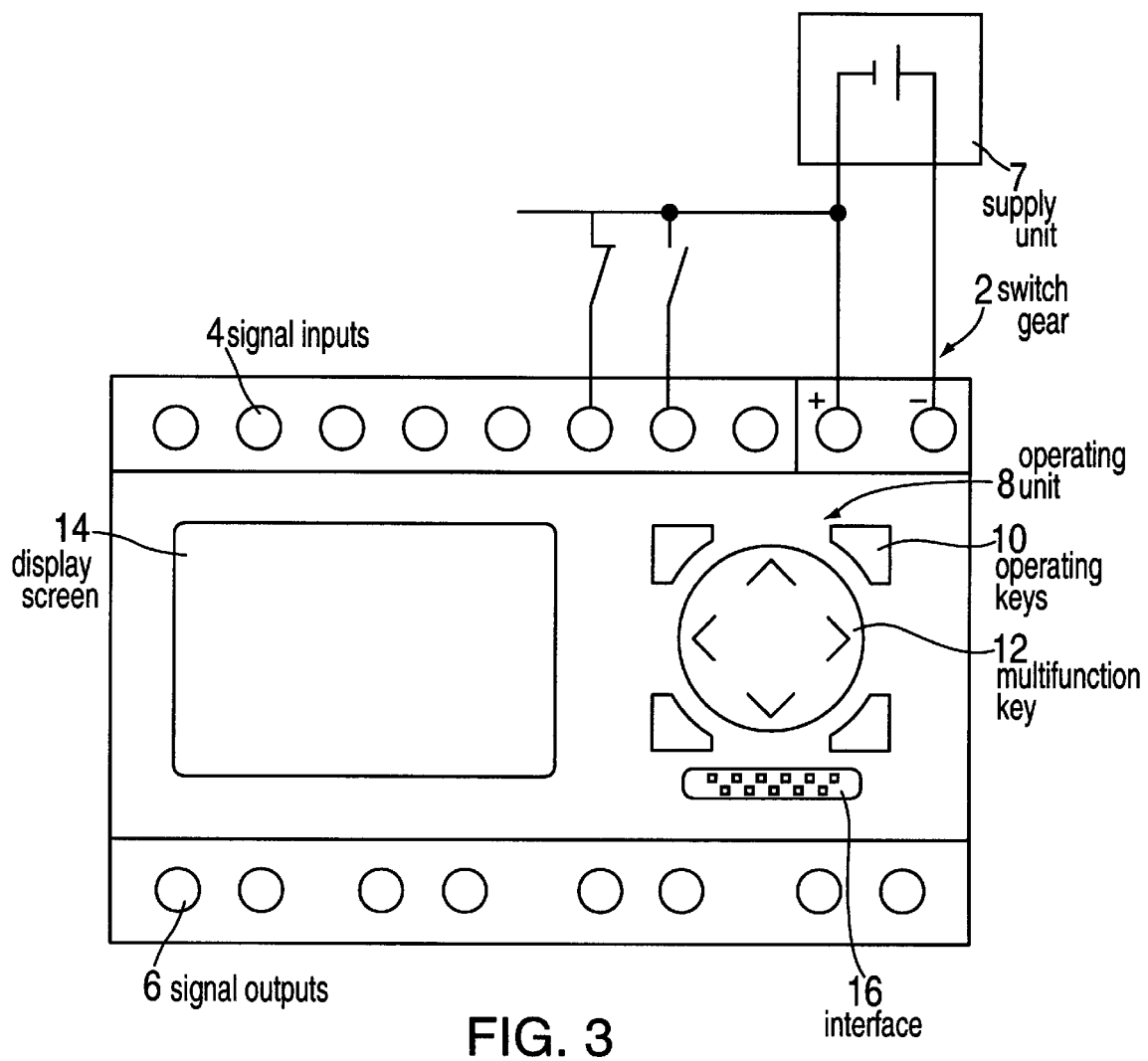
FIG. 3 shows a programmable control system.

FIG. 1 shows a circuit configuration according to the present invention for a direct-voltage power pack of an electronically controlled switching device. The circuit configuration is suitable for electronically controlled switchgear 2, shown in FIG. 3, particularly for programmable control systems. The switchgear 2 has at least one arithmetic-logic unit ($\mu$c), as well as signal inputs 4 and signal outputs 6. The switchgear 2 is supplied with voltage via an external direct-voltage power pack or supply unit 7, and this external voltage supply also is used as the voltage source for an electrical connection, such as wiring, to signal inputs 4. The programmable control system switches the flow of current between signal inputs 4 and signal outputs 6, under the control of a program (application program). The program can be input into arithmetic-logic unit ($\mu$c) or the arithmetic-logic/memory unit (e.g. microcontroller) of the control system with the assistance of an operating unit 8, composed preferably of four operating keys 10 and a multifunction key 12. The input and the program run can be observed on display screen 14. A menu-driven user interface is possible on display screen 14 during the programming, and the status display of signal inputs and outputs 4, 6 of the control system and/or the status display of signal inputs and outputs of functional modules and/or parameters of functional modules is possible on display screen 14 during operation. Alternatively, the control system also can be programmed and parameterized via an interface 16 using an external computer.

As shown in FIG. 1, the important components of the circuit configuration are a reverse-voltage protection diode 18, a backup capacitor 20, and, according to the present invention, a supply voltage detector 22 for detecting supply voltage $U_{ext}$ which is not backed up. In this context, detector 22 is preferably designed as a comparator to compare external voltage $U_{ext}$ to a predefined threshold value $U_{threshold}$. In response to any voltage failure, comparator 22 generates a signal DC-LOW which causes arithmetic-logic unit ($\mu$c) not to read in signal inputs 4 of switching device 2 again at this point of time (for the coming program cycle). The shown circuit configuration also has a comparator 24 for monitoring backup supply voltage $U_{int}$. This comparator 24 detects voltage failures of longer duration (which are no longer able to be backed up via capacitor 20) and causes arithmetic-logic unit ($\mu$c) to switch switching device 2 into a defined OFF state. Further, provision is made for a fixed-voltage controller 26 which controls internal supply voltage $U_{int}$ of 24 V DC to a signal level of 5 V DC for the communication with arithmetic-logic unit ($\mu$c).

Figure 2:
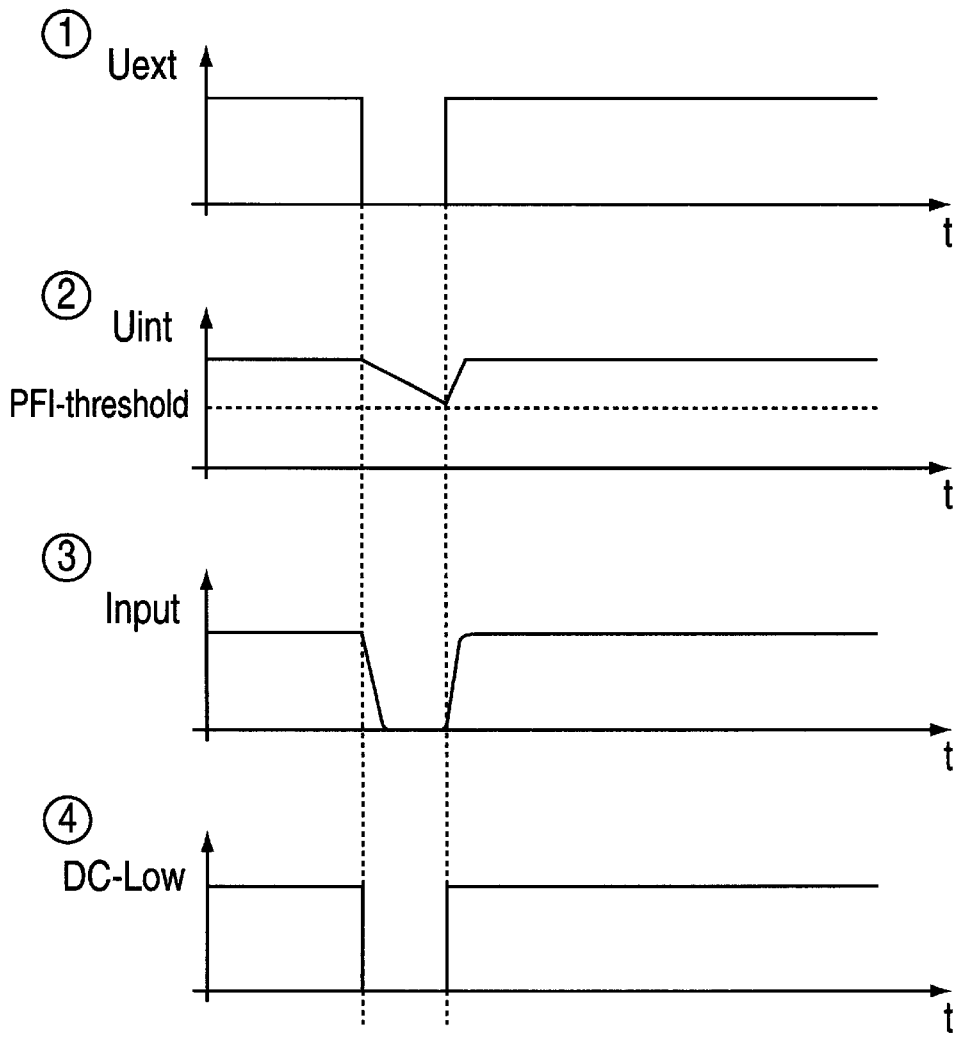
FIG. 2 shows state diagrams of different signal points of the circuit configuration.

FIG. 2 shows state diagrams of different signal points of the circuit configuration. Diagram 1 shows a failure of external supply voltage $U_{ext}$ of short duration. The duration of the voltage failure lies in a range which is offset by backup capacitor 20, so that no voltage failure is detected by comparator 24 used for monitoring internal supply voltage $U_{int}$ (diagram 2). Without the design of the circuit configuration according to the present invention, signal inputs 4, which are connected to external supply voltage $U_{ext}$, would now possibly experience a signal change from high signal to low signal (diagram 3) and, in the case of a counter circuit implemented by a programmable control system, for example, would produce erroneous counting results. The present invention provides for an additional signal DC-LOW to be generated at this point as a function of the state of the external supply voltage which is not backed up (diagram 4), routed to arithmetic-logic unit ($\mu$c) of the switching device, and, through the arithmetic-logic unit ($\mu$c), causes signal inputs 4 not to be read. Generally, this is performed by a program section—within the operating system or in a separate program corner—which is processed prior to the read-in operation of signal inputs 4.

A further preferred embodiment of the present invention relates to a programmable control system (FIG. 3) having such a circuit configuration as shown in FIG. 1. The programmable control system has at least one arithmetic-logic unit ($\mu$c), a display screen 14, an operating unit 8, as well as signal inputs 4 and signal outputs 6. The arithmetic-logic unit ($\mu$c), display screen 14, operating unit 8, signal inputs 4 and signal outputs 6 are accommodated in a shared housing, and the switching functions are programmable by the user via a menu-driven user interface on display screen 14. In this case, the control system is supplied via an external direct-voltage power pack 7, which at the same time forms the supply for the connections to signal inputs 4. The circuit configuration of the internal power pack likewise has a backup device 20 for the backup supply of external supply voltage $U_{ext}$. Further, the circuit configuration of the internal power pack of the programmable control system is also provided with detector 22 for detecting the supply voltage which is not backed up, thus, as already described above, reliably preventing signal inputs 4 from being read in, in response to any voltage failure of short duration.

Additionally, the present invention provides a method for reading in input signals for electronically controlled switchgear indicated at the outset, the supply voltage $U_{ext}$ which is not backed up being detected at the beginning of each program cycle. A monitoring signal, in particular a binary monitoring signal DC-LOW, is subsequently generated as a function of the presence of supply voltage $U_{ext}$, and finally, signal inputs 4 are read in or not read in as a function of the state of monitoring signal DC-LOW. In case of a short-duration failure of external supply voltage $U_{ext}$, signal inputs 4 are preferably not read in at the beginning of the next program cycle.

An example of a small programmable control system is one that when unconnected can be hand-held.

What is claimed is:

1. A circuit configuration for a direct-voltage power pack of an electronically controlled switching device, the switching device being supplied with a supply voltage by an external voltage supply with direct voltage, the switching device having an arithmetic-logic unit, signal inputs and signal outputs, the external voltage supply also being connected to the signal inputs, the circuit configuration comprising:

a backup voltage supplier for backing up the supply voltage; and a detector for detecting an input voltage of the external voltage supply which is not backed up by the backup voltage supplier and for generating an additional signal as a function of the input voltage, the signal inputs being read in by the arithmetic-logic unit as a function of the additional signal.

2. The circuit configuration as recited in claim 1 wherein the detector includes a comparator.

3. The circuit configuration as recited in claim 1 wherein the switching device is a programmable control system further comprising a display screen and an operating unit, with the arithmetic-logic unit, the display screen, the operating unit, the signal inputs and the signal outputs being accommodated in a shared housing, and switching functions being programmable by a user via a menu-driven user interface on the display screen.

4. The circuit configuration as recited in claim 1 wherein the switching device is a small programmable control system.

5. A method for reading in input signals in a switching device supplied by an external voltage supply with a direct voltage supply voltage, the switching device having an arithmetic-logic unit, signal inputs and signal outputs and having a program cycle, the external voltage supply also being used as a voltage source for the signal inputs, a circuit configuration having a backup voltage supplier for backing up the supply voltage so as to define a backed-up supply voltage and a non-backed-up supply voltage, the method comprising the steps of:

generating a binary monitoring signal by a comparator as a function of the non-back-up supply voltage;

querying the monitoring signal through the arithmetic-logic unit at least at a beginning of each program cycle; and reading the signal inputs into the switching device as a function of the monitoring signal.

6. The method as recited in claim 5 wherein the signal inputs are not read into the switching device if the supply voltage is not present.

7. The method as recited in claim 5 wherein the switching device is a small programmable control system.

8. A direct-voltage power pack for an electronically controlled switching device having an arithmetic-logic unit, a power input, signal inputs and signal outputs, the power pack comprising:

a direct voltage supply voltage line connected to the power input and to the signal inputs;

a backup voltage supplier connected to the direct voltage supply line so as to define a non-backed-up portion and a backed-up portion of the supply voltage line; and a detector for detecting a voltage of the non-backed-up portion and for generating an additional signal as a function of the voltage, the signal inputs being read in by the arithmetic-logic unit as a function of the additional signal.

9. The direct-voltage power pack as recited in claim 8 wherein the backup voltage supplier includes a capacitor.

10. The direct-voltage power pack as recited in claim 8 wherein the detector includes a comparator.

* * * * *

UNITED STATES PATENT AND TRADEMARK OFFICE
CERTIFICATE OF CORRECTION

PATENT NO.    : 6,252,312 B1                                        Page 1 of 1
DATED         : June 26, 2001
INVENTOR(S)   : Hubert, Rolf et al.

It is certified that error appears in the above-identified patent and that said Letters Patent is hereby corrected as shown below:

Column 2,
Line 13, change "(C)," to -- ($\mu$C), --

Signed and Sealed this

Twenty-sixth Day of November, 2002

Attest:

Attesting Officer

JAMES E. ROGAN
Director of the United States Patent and Trademark Office